UNITED STATES PATENT OFFICE.

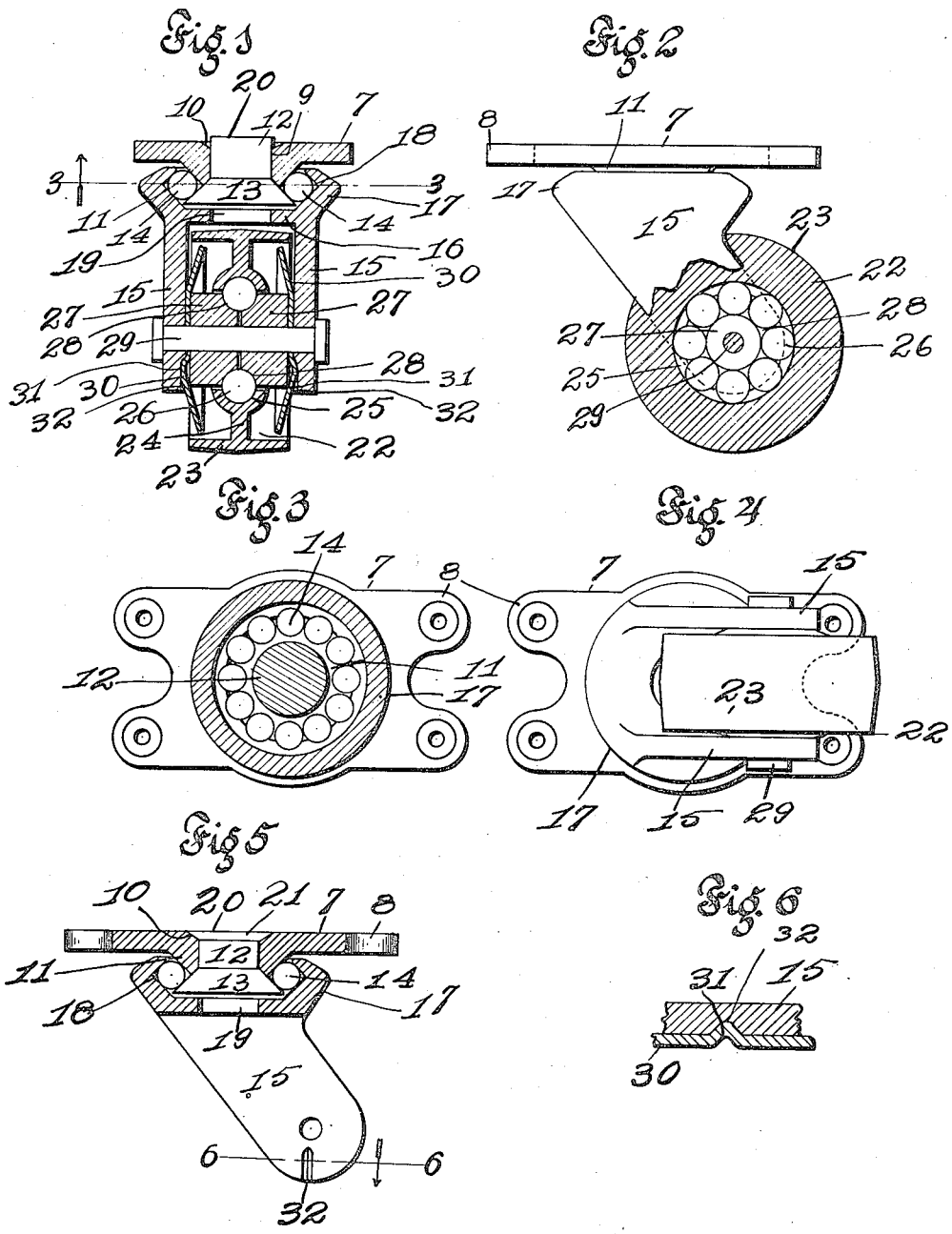

BENJAMIN H. BOWER AND OLIVER L. OSBORN, OF ST. LOUIS, MISSOURI.

BALL-BEARING CASTER AND THE LIKE.

1,153,838.
Specification of Letters Patent. Patented Sept. 14, 1915.

Application filed April 9, 1914. Serial No. 830,831.

*To all whom it may concern:*

Be it known that we, BENJAMIN H. BOWER and OLIVER L. OSBORN, citizens of the United States, and residents of St. Louis, Missouri, have invented certain new and useful Improvements in Ball-Bearing Casters and the like, of which the following is a specification.

Our invention relates to improvements in a ball-bearing caster and the like, and has for its object a ball-bearing turn table and a ball-bearing roll all properly connected and adaptable for use on shoe racks, trucks, furniture or any other articles where casters are found applicable. And the essential feature of our invention is the arrangement of the parts so that when once connected together the turn table portion is held at all times intact and prevented from becoming disconnected.

Figure 1, is a vertical sectional view of our complete invention. Fig. 2, is a side view of the same with a part broken away and in section. Fig. 3, is a horizontal sectional view taken on the line 3—3 of Fig. 1. Fig. 4, is a bottom plan view. Fig. 5, is a central sectional view of the turn table and roll support with a roll detached. Fig. 6, is a detail horizontal sectional view of the roll support and the shield made use of and taken on the line 6—6 of Fig. 5.

In carrying out our invention we provide a supporting plate 7, which is arranged with perforated ears 8, by which the plate is firmly secured in position to the article which it is to support. The said plate is provided with a central opening or aperture 9, and has a conical depression 10, and a conical extension 11. This construction is clearly shown in Figs. 1 and 5. In the central opening 9, is placed a rivet 12, which is provided with a conical head 13, its periphery and the periphery of the conical projection 11, acting as a race way for the bearing balls 14. In addition to the plate 7, and arranged in proper relation with the bearing balls is a roll support consisting of a casting having two side members 15, a connecting wall 16, and an upper projection 17, which is provided with a conical annular recess 18, which contacts with the periphery of the bearing balls and which completes the race way for said bearing balls. The connecting wall 16, is provided with a central opening 19, through which is inserted a mandrel or tool when riveting the upper end 20, of the rivet to assume the position as that shown by the numeral 21 in Fig. 5. When the upper edge of said rivet is hammered down to fit the conical recess 10, it is an absolute impossibility to disconnect the roll support and bearing balls from their position with the head 13, of the rivet. In other words, the bearing balls of the turn table ride upon the periphery of the projection 11, and rivet head 13, and the inner conical surface of the projection 17 of the roll support. Between the said walls 15, of the roll support is placed a roll 22, this roll comprising a casting consisting of a thread 23, and center web 24, and the ball race 25, which has a central curvilinear surface in which are placed bearing balls 26, and in the center of the ball race is placed a divided hub 27, each having a curvilinear recess 28, which conforms to the outer contour of the bearing balls 26, and upon which said balls travel while the roll is in rotation.

The divided hub 27, is firmly clamped in position between the walls 15, by a pin, button or the like 29, acting as an axle, and in order to prevent articles from contact with the roll and becoming wound around the axle and hinder proper rotation, such as for example, strings which might be on the floor and become twisted around the axle, we place on each side of the hub a shield 30. These shields are provided with a short projection 31, which is designed to fit into a depression 32, formed in the walls 15, and located in a position as that shown in Fig. 5. And when the projections are positioned in the depressions the shield 30 will remain stationary while the roll 22 will freely operate on the bearing balls.

Having fully described our invention what we claim is:

1. A ball bearing caster or the like comprising a supporting plate having a central conical projection, a cone headed rivet held centrally in the plate, a roll support consisting of two side members and connected together by an integral horizontal wall having a central opening, the upper end provided with a V-shaped annular recess acting as a race way; bearing balls located in the race way and contacting with the inner surface of the recess, the cone head of the rivet and the inclined projection of the plate; and a roll axially mounted in the roll support, substantially as specified.

2. A device of the class described comprising a caster consisting of a roll supporting member and a supporting plate, each provided with inclined surfaces; a cone headed rivet located between the two, bearing balls located between the two and contacting with the inclined surfaces and cone head of the rivet and when so placed interlocking both members together; and a roll axially mounted in the roll supporting member, substantially as specified.

In testimony whereof, we have signed our names to this specification, in presence of two subscribing witnesses.

BENJAMIN H. BOWER.
OLIVER L. OSBORN.

Witnesses:
H. R. BRINDLE,
ALFRED A. EICKS.